(12) United States Patent
Taylor

(10) Patent No.: US 6,394,325 B1
(45) Date of Patent: May 28, 2002

(54) GOLF CART COOLER

(76) Inventor: Michael S. Taylor, 1539 Bromley Ave., La Puente, CA (US) 91746

(*) Notice: Subject to any disclaimer, the term of this patent is extended or adjusted under 35 U.S.C. 154(b) by 0 days.

(21) Appl. No.: 09/698,960

(22) Filed: Oct. 30, 2000

(51) Int. Cl.⁷ .................................................. B60R 9/00
(52) U.S. Cl. .................. 224/274; 224/572; 224/926; 206/315.3
(58) Field of Search ................................ 224/274, 572, 224/926; 206/315.3

(56) References Cited

U.S. PATENT DOCUMENTS

| | | | | |
|---|---|---|---|---|
| 2,723,535 A | * | 11/1955 | Jones | 224/274 |
| 4,550,930 A | * | 11/1985 | Proffit | 224/274 |
| 4,889,267 A | * | 12/1989 | Bolton | 224/274 |
| 4,989,767 A | * | 2/1991 | Buschbom | 224/274 |
| D330,275 S | * | 10/1992 | West | D34/15 |
| 5,409,154 A | * | 4/1995 | Blount | 224/274 |
| 5,439,241 A | * | 8/1995 | Nelson | 280/47.25 |
| 5,533,361 A | * | 7/1996 | Halpern | 62/371 |

* cited by examiner

Primary Examiner—Stephen K. Cronin
(74) Attorney, Agent, or Firm—Cleveland R. Willliams III

(57) ABSTRACT

This invention resides in a portable cooler that is removably attached to a golf, pull cart for easily and efficiently transporting ice, food, beverages and other items over a golf course by individuals playing golf. The portable cooler has a top wall that is slightly tapered downwardly from the front to the back, a right wall and a left wall that are spaced apart and mutually converge from the front wall to the back wall. A bottom wall is horizontal and is tapered inwardly from the front to the back of said wall. The back wall is tapered inwardly from the bottom wall to the top wall and a front wall is tapered outwardly from the bottom wall upwardly toward the top wall. An access flap is positioned over an opening in the top section of the front wall and is positionable to cover or uncover said opening. The walls of the cooler when joined together form an interior cavity for the storage of various items. The access flap has securing means for keeping the flap closed when the cooler is not being used to retrieve various items. The top wall of the cooler contains a first, top flexible strap with securing means for supporting and attaching said cooler to a golf cart. A second, back flexible strap with securing means stabilizes and supports the cooler when attached to a golf cart. The cooler contains an inner support structure that is attached to the upper, inside portions of the top wall and near the opening of the front wall. The cooler has a plurality of external pockets for carrying a variety of items. The cooler is constructed utilizing three layers of pliable materials, which provide for durable, flexible, waterproof, thermal barrier and cloth materials.

19 Claims, 4 Drawing Sheets

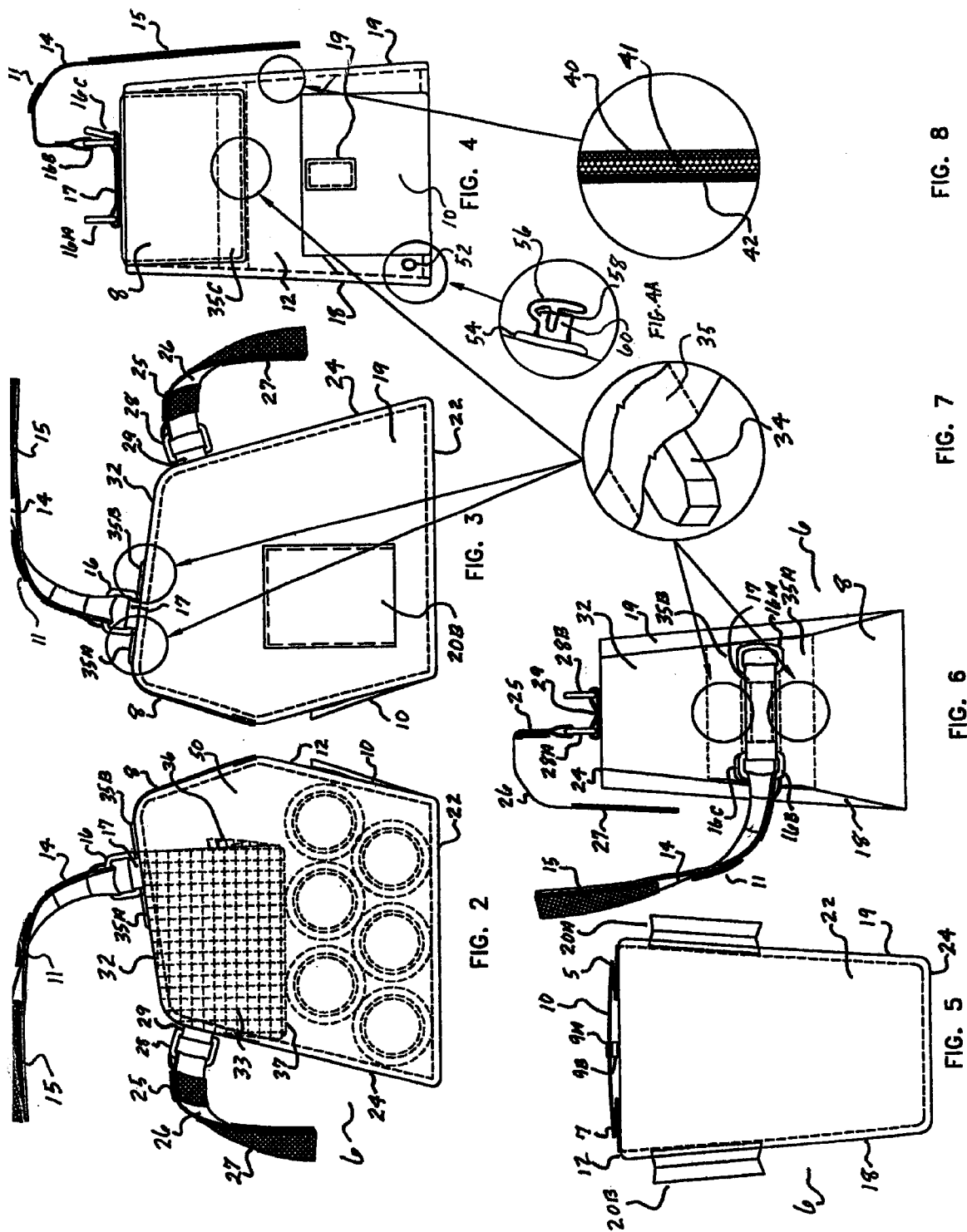

GOLF CART COOLER

BACKGROUND OF THE INVENTION

1. Field of the Invention

This invention relates to a cooler that is attached to a golf pull cart. The cooler contains a cooling compartment and a plurality of external pockets for carrying various items, such as food, beverages and other paraphernalia.

Individuals that play golf normally transport their equipment on a golf course using one of three methods, namely, hire a caddy, rent a motorized golf cart, or either pull or push a golf cart over said golf course. If the individual playing golf desires a beverage, food, or other items during the golf game he or she has to obtain such items at the clubhouse. Individuals who rent a motorized golf cart have the luxury of carrying a standard cooler on the golf cart.

Previously, coolers and ice chests generally consisted of a large rectangular box type structure, constructed from an insulation material into which ice, beverages and food items are placed. Typically, these types of coolers are carried to a desired location by grasping handles attached to the sides of the cooler. This type of cooler, however, suffers from the disadvantage of being difficult for one person to carry over long distances.

More recently, coolers have been developed which are carried on an individuals back, similar to a backpack. These types of coolers are not very advantageous for individuals playing golf because they would be constantly removed from the individuals back or placed on the individuals back depending upon the stage of the golf game.

Thus, there is a need for a cooler that can be easily attached to a golf pull cart and which can be easily transported by one person over long distances during the course of a golf game.

2. Description of the Prior Art

Various coolers have been utilized in the past to transport beverages, food and the like over long distances. For Example, U.S. Pat. No. 5,725,351 to Guibert et al. relates to a golf accessory bag attached to a golf pull cart. The golf accessory is attached to a golf pull cart in a substantially triangular space located between the two wheels, the throat portion and the golf bag platform of said pull cart. The golf accessory bag may comprise a shell having four corners and is formed of a triangular shaped bottom wall and three triangular shaped side walls. The golf accessory bag may have a plurality of chambers inside the shell and external pockets for transportation of personal golf items or accessories.

U.S. Pat. No. 5,421,172 to Jones is directed to a cooler having a pivotably fastenable lid and a coolant container which fits snugly within the underside region of the led. The lid is defined by a plurality of generally opposing, inwardly facing sidewalls that extend downward towards the cooler bottom.

U.S. Pat. No. 5,409,154 to Blount teaches a support device for coolers that is removably attachable to golf carts. The device is described as suitable for supporting and transporting a cooler. The support device consists of an interior C-shaped member formed of a rigid material and positionable in a horizontal orientation. A rectangular support member is attached to the C-shaped member with attachment means at a predetermined angle. A U-shaped tongue extends downwardly at an angle from the central extent of the coupling edge of the C-shaped member and rectangular support member. A cooler is removably placed in the rectangular support member attached to the golf cart enable lid and a coolant container which fits snugly within the underside region of the lid. The lid is defined by a plurality of generally opposing, inwardly facing sidewalls that extend downward towards the cooler bottom.

U.S. Pat. No. 5,407,218 to Jackson discloses a wheeled cooler having wheel members for rolling displacement on a base surface. The wheel members are simply and easily removed form the cooler to allow for a stabilization of the cooler on any type of surface.

U.S. Pat. No. 5,400,610 to Macedo relates to a portable insulated container for keeping food products at desired temperature levels. The portable insulated container has a temperature indicating mechanism which is responsive to the relative temperature within the interior of the container without the need for exposing the contents of the container to ambient conditions.

As can readily be determined from the foregoing there is an ongoing research effort to produce new and novel portable coolers for the easy and efficient transport of food, beverages and other items over long distances.

SUMMARY OF THE INVENTION

The present invention resides in a portable cooler that is removably attached to a golf cart for transporting ice, food, beverages and other items over a golf course by individuals playing golf. The present invention resides in a cooler device which is suitable for mounting onto a golf bag, pull cart. The cooler comprises a container having a top wall that is slightly tapered downwardly from the front to the rear, a right wall and left wall that are spaced apart and mutually converge from the front to a back wall and are tapered inwardly in an upword direction from the bottom wall to the top wall, a bottom wall that is horizontal, a back wall that is tapered inwardly from the bottom wall to the top wall and a front wall that is tapered outwardly from the bottom wall upwardly toward the top wall. An access flap is positioned over an opening in the top portion of the front wall and is positionable to cover or uncover said opening. Velcro strips attached to the lower inside of the access flap and the upper outside of the front wall provide securing means therefor. The top wall of the container contains first top flexible strap means and two support struts located on either side of the flexible strap means and extending horizontal between the right and left walls. The top flexible strap attaches to a golf pull cart and supports the cooler on said golf cart. Second, flexible strap means located near the top portion of the back wall provides additional support and stabilization for the cooler when attached to a golf cart. The container contains inner support means for food products attached to the upper section of the back and side walls of said container. The support means has an opening at the front which allows for easy access therein. The container has a plurality of external pockets for carrying a variety of items. The container preferably has a three layer construction which provides for a durable, flexible, water-proof and thermal barrier material.

BRIEF DESCRIPTION OF THE DRAWINGS

FIG. 2 is a cut-away, side view of the cooler showing inner support means, top and back support means, front access flap, front external pocket, inner food net shelf and phantom beverage containers.

FIG. 3 is a side view of FIG. 2 which has been rotated 180 degrees and showing the right external side pocket.

FIG. 4 is a front view of the cooler showing the front flap and front pocket.

FIG. 4A is a front view of the water release value in FIG. 4.

FIG. 5 is a bottom view of the cooler showing right and left external side pockets, the front pocket and the bottom edges of the side walls tapered inwardly from the front toward the back of said cooler.

FIG. 6 is a top view of the cooler of FIG. 5 which has been rotated 180 degrees. Top and back support strap means are also shown.

FIG. 7 is a cut-away view of the support struts in FIGS. 3, 4 and 6.

FIG. 8 is a cut-away view of the cooler in FIG. 4 showing the three material construction of the fabric of said cooler.

DETAILED DESCRIPTION OF THE INVENTION

Figure 1:
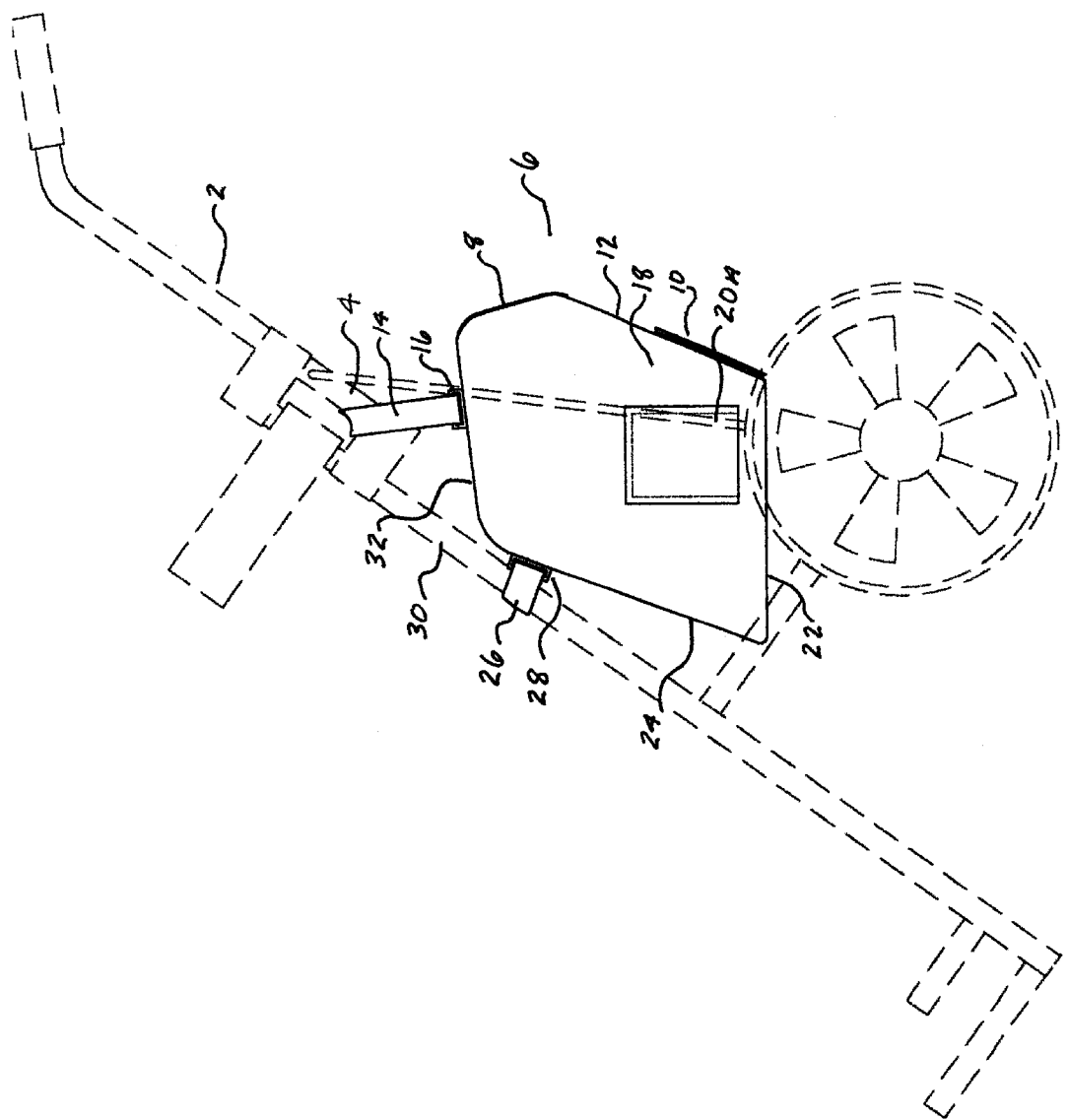
FIG. 1 is a side view of the cooler attached to a phantom golf bag cart.

The present invention resides in a portable golf cart cooler, that is removably attached to a golf cart and is especially suitable for transporting ice, food, beverages and other items over a golf course by individuals playing the game of golf.

Embodiments of the golf cart cooler of the present invention are hereinafter described with reference to the drawings, in which identical or corresponding parts are indicated by the same reference characters or numbers through the several views.

FIG. 1 illustrates a side view of portable golf cart cooler 6 attached to phantom golf bag cart 2 wherein said golf bag cart 2 has a tripod like configuration and golf cart cooler 6 is centered in the tripod in an upright position.

Golf cart cooler 6 contains bottom wall 22 which is substantially horizontal. Back wall 24 is attached to the back end of bottom wall 22 and is tapered inwardly in an upper direction to top wall 32, which is tapered downwardly from the front flap 8 to back wall 24. Front wall 12 is tapered outwardly from bottom wall 22 in an upward direction. Front flap 8 is hingably attached to top wall 32 and is connected to the top portion of front wall 12 with connection means. Front pocket 10 is located near the bottom portion of front wall 12 and left side pocket 20A is located on left side wall 18. Front pocket 10 is an adjustable beverage can or bottle holder.

Top support strap 14 is anchored to top wall 32 by top anchor ring 16. Top support strap 14 is removably attached to golf cart shaft 4 with adjustment and attachment means. Back support strap 26 is anchored to back wall 24 by back anchor ring 28. Back support strap 26 is removably attached to golf cart shaft 30 with adjustment and attachment means.

The front, back, bottom, left and right (not shown) walls of the present invention define an internal cavity which is accessible through the front lid of said cooler. It should additionally be noted that golf cart cooler 6 is normally in a centered, upright position when the golf cart is in a resting position or is being pulled by a golfer.

FIG. 2 is a side cut-away view of golf cart cooler 6 showing bottom wall 22, back wall 24, front wall 12, front flap 8, top wall 32, and front pocket 10, which have been previously described in FIG. 1. Phantom beverage containers are shown in the bottom of golf cart cooler 6. Back support strap 26 is shown in an open position containing attachment means (velcro strips 25 and 27).

Back support strap 26 is attached to anchor ring 28 which is attached to the top portion of back wall 25 by second anchor strip 29. Anchor strip 29 is a strip of pliable material such as nylon, canvas etc, which loops through anchor ring 28 and is sewn or attached by conventional means to back wall 24. Mesh container 31 contains bottom 13, left 33, right (not shown) and front 36 walls which define a second internal support cavity accessible through the front opening (not shown).

Top support strap 14 is in an open position and displays attachment means (top velcro strips 11 and 15). Top support strap 14 is attached to top anchor ring 16 which is attached to the top wall 32 by first anchor strip 17 which loops through anchor ring 16 and is sewn or attached by conventional means to top wall 32. It is to be noted that all of the straps herein contain adjustable rings and/or buckles to facilitate the attachment to and removal of the golf cart coolers herein from golf pull carts.

Top support means contained in sewn compartments 35A and 35B, spaced apart and located on opposite sides of top support strip 17 help to maintain the golf cart cooler's shape and integrity when transporting food, beverages and other items while attached to a golf bag cart.

FIG. 3 is a side view of FIG. 2 which has been rotated 180 degrees. The only new features shown in this drawing that were not shown in FIG. 2 is right side pocket 20B attached to right wall 19. Otherwise the elements and reference numbers are the same.

FIG. 4 is a front view of golf cart cooler 6 showing bottom wall 22. Right side wall 18 is tapered inwardly in an upward direction from bottom wall 22, where it attaches to one side of top wall 32. Left side wall 19 is also attached to bottom wall 22 and is tapered inwardly in an upward direction where it attaches to the opposite side of top wall 32.

Top anchor strip 17 is attached to top wall 32 by conventional means such as sewing etc. Top anchor strip 17 in this position shows anchor ring 16B which attaches to top support strap 14 containing velcro strips 11 and 15. In use, top support strap 14 loops around an upper golf cart shaft for support, through rings 16A and 16C and is securely attached to said golf cart shaft by contacting velcro strip 11 with velcro strip 15.

Front lid 8 is shown in a closed position. It should be noted that velcro strips (not shown) are located on the inside, near the bottom portion of front lid 8 and on the outside, near the top of front wall 12. When the strips contact each other, the front lid is secured to the top of front wall 12. Front lid 8 opens in a hinge like manner when the velcro strips described-above, are pulled apart by applying an outward and upward pressure on front lid 8. Front pocket 10 is located directly below front lid 8 showing a cut-away view of velcro strip 9. FIG.

4A is a front view of water release value 52 which attached to the lower front wall portion of front wall 10 in FIG. 4. Water release value 52 is fused onto the water proof inner liner and contains cone washer 54 at its base, water release body 56 and water plug 58 which retains water in cooler 6 when closed and releases water when it is opened. Water release valve 52 is a conventional water release valve.

FIG. 5 is a bottom view of golf cart cooler 6 which shows bottom wall 22 tapering inward from front wall 12 to back wall 24. A bottom view of right side pocket 20A and left side pocket 20B is shown.

FIG. 6 is a top view of golf cart cooler 6 which shows right side wall 18 and left side wall 19 tapering inwardly from the bottom thereof in an upward direction. Back support strap 26 is shown in an open position where it is attached to anchor ring 28A.

Anchor ring 28A and support ring 28B are attached to back wall 24 by anchor strip 29 which loops through rings 28A and 28B and is secured to back wall by sewing, etc. In use, back support strap 26 is looped around a gold cart shaft, passes through ring 28B and is secured by pressing velcro strips 25 and 27 together.

The view showing top support strap 14, the anchor and support rings and the velcro strips is the same as the view shown in FIG. 4. Support means contained in sewn compartments 35A and 35B are shown on opposite sides of anchor support strip 17 extending from right side wall 18 to left side wall 19.

FIG. 7 is a cut away perspective of sewn compartment 35 (A, B and C) as shown in FIGS. 3, 4 and 6. First and second support shafts 34A and 34B are contained in first and second sewn compartment 35A and 35B as depicted in FIGS. 3 and 6 located on top wall 32, and FIG. 4, where third support shaft 35C is contained in third sewn compartment 34C, located behind the velcro strip near the top of front wall 12.

Shaft 34 can be constructed from a variety of materials, for example, plastic, metal, wood, etc. The preferred material is plastic. It should be noted that the material used must be strong enough to ensure the shape and integrity of the golf cart cooler when in use. Thus shaft 34 is able to flex without loosing its firmness.

FIG. 8 is a cut away view of the left side wall 19 of golf cart cooler 6 showing three distinct materials which make up the various walls of said cooler. The walls herein contain an inner first material 42 such as a pliable plastic or a vinyl liner which acts as a barrier for water and moisture. It should be noted that the inner first materials herein can contain designs or logos thereon the advertise and/or provide an aesthetically pleasing interior of the coolers herein.

The second, intermediate material 41 is preferably a pliable insulation material for example a flexible polyolefin, such as polyethylene or a foamed polyurethane, or a close cell polyethane foam, such as polycarbonate.

The third, outer material 40 is preferably constructed from nylon, canvas, cotton or the like. The only restriction is that the outer material be durable under use conditions. The materials herein may be connected to each other by sewing, sonic welding, heat welding, etc.

It should additionally be noted that logos may be attached to the inside of access flap 8 herein, as well as the external pockets 20A, 20B, 9, 5, and 7 herein.

Figure 9:
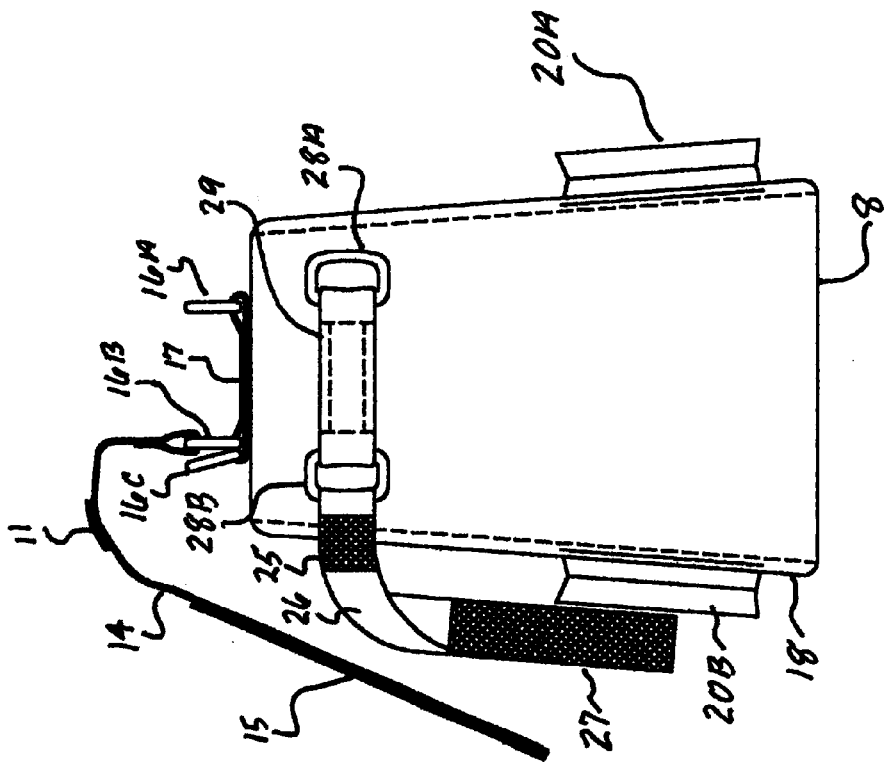
FIG. 9 is a back view of the cooler showing external side pockets and top and back support strap means.

FIG. 9 is a back view of golf cart cooler 6 which shows back wall 24, and back support strap 26 in an open position showing velcro strips 25 and 27. The relationship between back support strap 26, anchor support ring 28A, second back anchor and support strip 29 and second support ring 28B is shown in this view. Right side pocket 20A and left side pock 20B are attached to right side wall 19 and left side wall 18 respectively.

Top support strap 14, anchor and support rings 16A, 16B and 16C and anchor and support strip 17 are the same as disclosed and described in FIG. 4.

Figure 10:
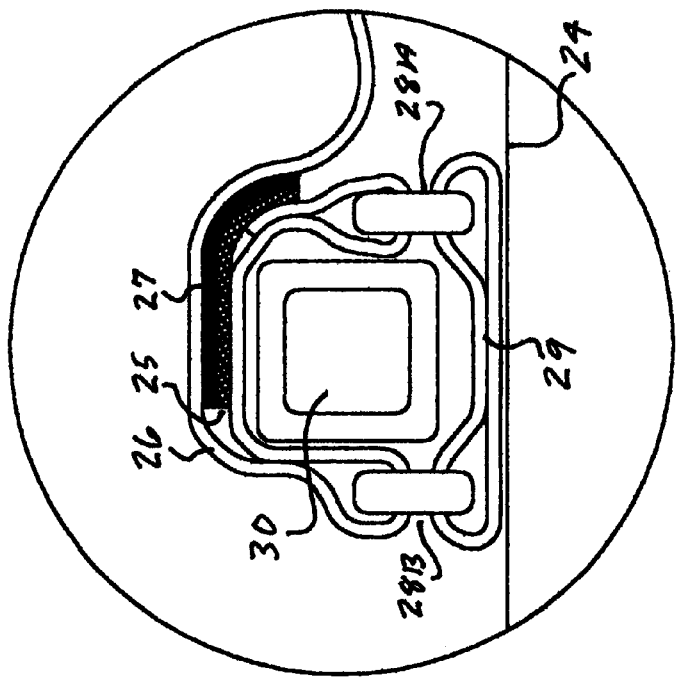
FIG. 10 is an isolated top view of a support strap of the cooler in FIG. 9.

FIG. 10 is a cut away view of back support strap 26 shown in a closed position around golf cart shaft 30. Back support strap 26 is anchored to anchor support ring 28A at one end using conventional means. Back support strap 26 is looped around golf cart shaft 30, through one side of the opening in second support ring 28B where velcro strips 25 and 27 secure back strap 26 in a secured position by pressing the two strips together. First and second rings 28A and 28B are secured to back wall 24 by back anchor strip 29.

Figure 11:
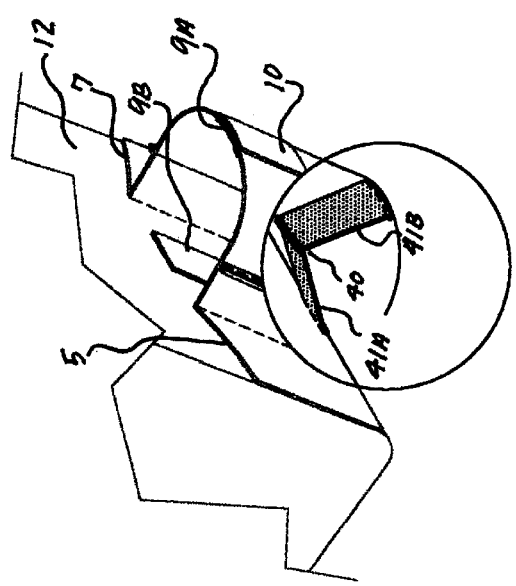
FIG. 11 is a cut-away-front view of the external front pocket showing the unique hinge like action of the bottom of said front pocket.

FIG. 11 is a cut-away view of front pocket 10 showing bottom support strips 41A and 41B, which are sewn together at demarcation line 44 in such a manner that said bottom support strips 41A and 41B exhibit hinge like properties. This allows front pocket 10 to fit flush against front wall 12 when not in use. Bottom support strip 41A attaches to front wall 12 and bottom support strip 41B attaches to the bottom of front pocket 10. Velcro strip 9A is attached to the top inside of front pocket 10 near the top and in a centered position therein. A second velcro strip 9B is attached to front wall 12 in a position opposite that of velcro strip 9A. The front pocket 10 may be opened up by separating velcro strips 9A and 9B or closed and secured by pressing said velcro strips together. Front pocket 10 is specifically constructed to receive beverage cans and water bottles.

Second 5 and Third 7 front pockets are located on the right and left sides of first front pocket 10. Cigars, lighters, pencils and the like may be located in these pockets.

Figure 12:
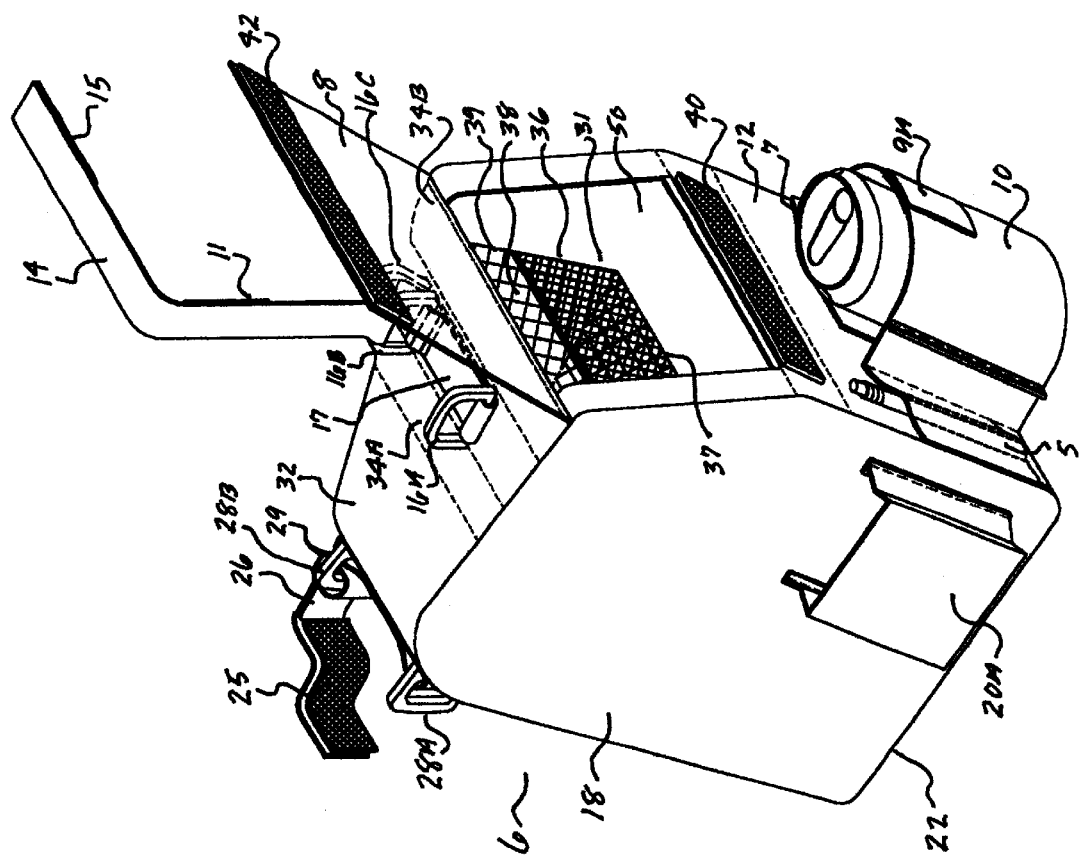
FIG. 12 is a frontal perspective view of the cooler with the front flap in a open position showing the interior support structure. The left side external pocket, top and back support straps and front external pocket are also shown. This FIG. shows a three chamber front external pocket suitable for holding various items.

FIG. 12 is a front prospective view of the golf cart cooler herein which shows left side wall 18 attached to bottom wall 22 and top wall 32. Left side pocket 20A is located near the bottom portion of side wall 18. First front pocket 10 is attached to front wall 12. Second front pocket 5 contains a pencil, wherein said second front pocket 5 and third front pocket 7 are attached to first pocket 10. Velcro strip 9B is located on the outside of front wall 12. First pocket 10 is in an open position and contains a beverage can.

Front lid 8 is in an open position and shows velcro strip 42 located on the inside and near the bottom thereof Velcro strip 40 is located near the top and on the outside of front wall 12. Velcro strips 40 and 42 secure front lid 8 in a closed position when pressed together. In the open position, front lid 8 shows first interior cavity 50, which is suitable for containing items such as ice, food, beverages, etc.

Storage container 31 is of a mesh construction and contains a bottom, left side (not shown), right side 39 and front 36 which define a second cavity and having opening 38 for receiving items. The left (not shown) and right 39 side walls are attached to the top wall 32 of golf cart cooler 32 where side walls 18 and 19 attach to top wall 32. Opening 38 allows for the easy insertion and retrieval of food and other items from container 31. Otherwise, the other elements in FIG. 12 are the same as the elements shown in FIGS. 3, 4, 6 and 9.

Obviously, many modifications and variations of the invention, as hereinbefore set forth, may be made without departing from the spirit and scope thereof, and therefore, only such limitations should be imposed as are indicated in the appended claims.

I claim:

1. A golf cart cooler that is removably attached to a golf cart having a tripod configuration comprising: a container having a top wall that is slightly tapered downwardly and wherein the sides mutually converge from the front to the back, a bottom wall that is horizontal, a left wall and a right wall that are spaced apart and tapered inwardly in an upper direction from the bottom wall to the top wall, a back wall that is tapered inwardly from the bottom wall to the top wall, a front wall that is tapered outwardly from the bottom wall toward the top wall, an access flap that is hingably attached to the front of the top wall, top securing means attached to the top wall; and back securing means attached to the back wall.

2. The golf cart cooler described in claim 1 wherein the walls and access flap comprise a three layer construction with an inner layer of plastic, an intermediate layer of insulation material and an outer layer of cloth material.

3. The golf cart cooler of claim 2, wherein the insulation material is a polyolefin selected from the group of polyethylene, foamed polyurethane and polycarbonate.

4. The golf cart cooler of claim 2, wherein the outer layer is a member selected from the group of nylon, canvas, and cotton.

5. The golf cart cooler of claim 1, including a plurality of pockets located on the front and side walls of said cooler.

6. The golf cart cooler of claim 5, including a left side pocket located on the left wall and a right side pocket located on the right wall.

7. The golf cart cooler of claim 5, including a three compartment pocket containing a hinge-like bottom strap located on the front wall.

8. The golf cart cooler of claim 1, wherein the access flap and front wall contain securing means for securing said access flap to the front wall.

9. The golf cart cooler of claim 8, wherein the securing means comprises a velcro strip located on the inside and near the bottom of the access flap and a velcro strip located on the outside and near the top of the front wall.

10. The golf cart cooler of claim 1, wherein top securing means comprises a top support strap containing two separate and spaced apart velcro strips, wherein one end of the top support strap is attached to a top anchor ring, said anchor ring is attached to a top support strip at one end and a second support ring is attached at the opposite end of the top support strip.

11. The golf cart cooler of claim 10, including a third support ring attached to the top support strip.

12. The golf cart cooler of claim 10, wherein the top support strap is wrapped around the strut of a golf cart, through the top support ring and is secured by pressing together the two velcro strips located thereon.

13. The golf cart cooler of claim 1, wherein the back securing means comprises a back support strap containing two separate and spaced apart velcro strips, wherein one end of the back support strap is attached to a back anchor ring, said anchor ring is attached to a back support strip at one end and a second support ring is attached to the opposite end of the back support strip.

14. The golf cart cooler of claim 13, wherein the back support strap is wrapped around the strut of a golf cart, through the back support ring and is secured by pressing together the two velcro strips located thereon.

15. The golf cart cooler of claim 1, including an inner support structure that is attached to the upper, inside portion of the top wall where the left and right side walls attach to said top wall.

16. The golf cart cooler of claim 15, wherein the inner support structure has a bottom wall, a left side wall, a right side wall and a front wall that allows access into said inner support structure.

17. The golf cart cooler of claim 15, wherein the inner support structure is composed of nylon having a mesh configuration.

18. The golf cart cooler of claim 1 including first and second support shafts spaced apart and located on opposite sides of an anchor strip.

19. The golf cart cooler of claim 1, including a third support shaft located near the top of the front wall.

* * * * *